No. 883,242. PATENTED MAR. 31, 1908.
W. F. SAVAGE.
ATTACHMENT FOR TROLLEY HARPS.
APPLICATION FILED MAY 3, 1907.

Witnesses
Carl Stoughton
F. G. Campbell

Inventor
William F. Savage
By
Chester C. Shephard
Attorney

UNITED STATES PATENT OFFICE.

WILLIAM F. SAVAGE, OF COLUMBUS, OHIO.

ATTACHMENT FOR TROLLEY-HARPS.

No. 883,242.   Specification of Letters Patent.   Patented March 31, 1908.

Application filed May 2, 1907. Serial No. 371,572.

*To all whom it may concern:*

Be it known that I, WILLIAM F. SAVAGE, citizen of the United States, residing at Columbus, in the county of Franklin and State of Ohio, have invented certain new and useful Improvements in Attachments for Trolley-Harps, of which the following is a specification.

My invention relates to attachments for trolley harps and has for its object the provision of a device of this character constructed in such manner that it may be readily attached to the trolley harps that are already in use and which will serve when attached to said trolley harps, to catch and guide the trolley wire into the groove of the trolley wheel when the trolley wheel slips from the wire.

Further objects and advantages of the invention will be set forth in the detailed description which now follows.

Figure 1:
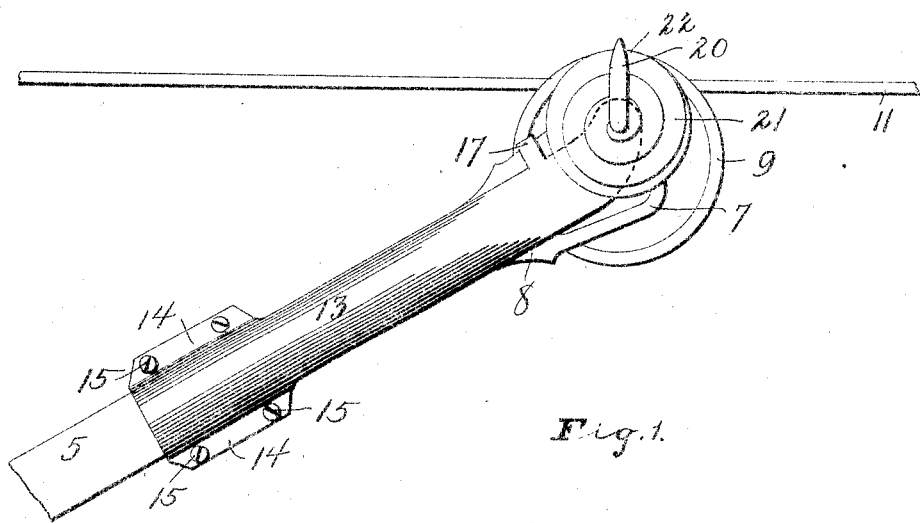
Figure 2:
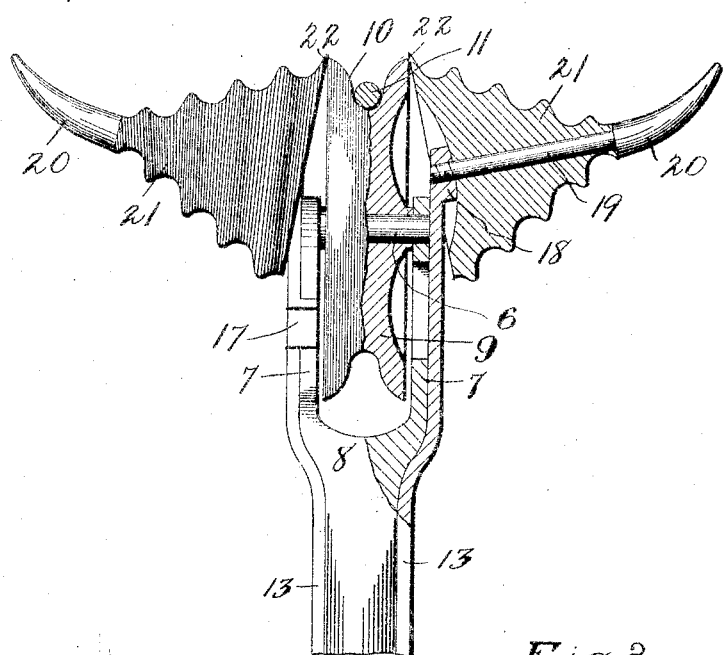

In the accompanying drawing: Figure 1 is a side elevation of a trolley harp equipped with the attachment, and, Fig. 2 is a view partly in front elevation and partly in section of said trolley harp and attachment.

Like numerals designate corresponding parts in both of the figures of the drawing.

Referring to the drawing, the numeral 5 designates an ordinary trolley pole. Journaled upon a shaft 6 between the forks 7 of an ordinary trolley harp 8 which is carried by the pole 5, is a trolley wheel 9. This trolley wheel is grooved as at 10 in the usual manner for the reception of the trolley wire 11. The parts so far described are all of the usual and well known construction.

Clamped upon the trolley pole are plates 13, these plates having outstanding ears 14, through which bolts 15 pass. Nuts 16 are threaded upon the ends of these bolts and serve to bind the plates 13 closely against the sides of the trolley pole and harp, the plates conforming to the curvature of the trolley harp and lying close against the sides of said trolley harp. These plates carry clips 17 which are bent over the edges of the trolley harp to impart additional rigidity to the structure and to give the plates a bearing upon the trolley harp at the upper portion thereof. These plates are provided with lugs 18 into which inclined shafts 19 are threaded. The outer ends of these shafts are continued to form upturned horns 20. Mounted to turn upon the shafts 19 between the horns 20 and the lugs 18, are conical spirally grooved members 21, the grooves in these members being of such inclination as to guide the trolley wire back into the groove of the trolley wheel when the trolley wheel slips from the wire.

It will of course be apparent that when the trolley wheel slips from the wire, the wire will be caught at some point between the tips of the horns 20 and the points 22 of the members 21. The forward movement of the car will cause the member 21 with which the wire engages, to revolve, as said member rides along the underside of the wire. This rotation of the member 21, will bring the trolley wheel over beneath the trolley wire by virtue of the spiral grooves engaging said trolley wire, as will be readily understood.

One of the most important features of this invention resides in the fact that the members with which to guide the trolley wheel back upon the wire, are separate from the trolley wheel proper. It is apparent that the plates 13 and the parts carried thereby, may be clamped upon an ordinary trolley pole in two or three minutes. The result of employing a structure such as herein shown and described, is to render it possible to still use the trolley wheels that are already in use and to equip the cars with this improved device without causing them to lose a trip.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim is:—

1. In a device of the character described, the combination with an ordinary trolley pole and wheel, of members adapted to be clamped to said trolley pole, and conical spirally grooved rotative members carried by the members that are clamped to the trolley pole.

2. In a device of the character described, the combination with an ordinary trolley harp and wheel, of a pair of members adapted to be clamped to the sides of said trolley harp, and conical spirally grooved rotative members carried by said first named members which lie upon each side of the trolley wheel and are adapted to guide said trolley wheel beneath the trolley wire.

3. In a device of the character described, the combination with an ordinary trolley harp and wheel, of a pair of members adapted to be clamped to the sides of said trolley harp, conical spirally grooved rotative members carried by said first named members which lie upon each side of the trolley wheel and are adapted to guide said trolley wheel beneath the trolley wire, and fixed upturned horns located at the ends of said spirally grooved members.

4. In a device of the character described, the combination with an ordinary trolley wheel and harp, of a pair of plates, means for securing said plates to the sides of the trolley harp, inclined shafts projecting from said plates, upturned horns carried upon the outer ends of said shafts, and conical spirally grooved members mounted upon said shafts between said plates and said horns.

In testimony whereof I affix my signature in presence of two witnesses.

WILLIAM F. SAVAGE.

Witnesses:
   L. CARL STOUGHTON,
   A. T. PHELPS.